UNITED STATES PATENT OFFICE.

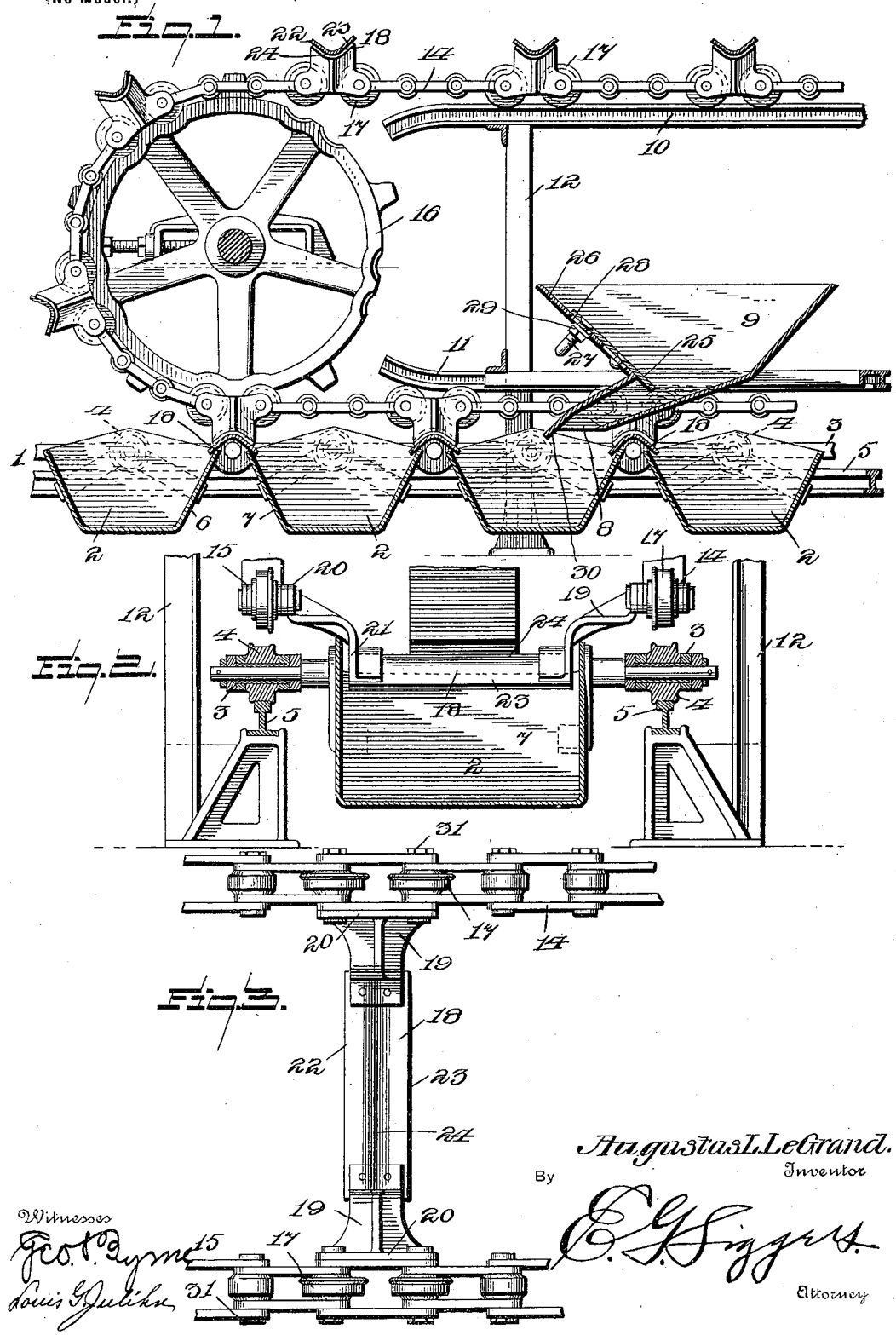

AUGUSTUS L. LE GRAND, OF WEST PITTSTON, PENNSYLVANIA, ASSIGNOR OF ONE-HALF TO JOHN N. THOMAS, OF SAME PLACE.

LOADING MECHANISM FOR CONVEYERS.

SPECIFICATION forming part of Letters Patent No. 658,657, dated September 25, 1900.

Application filed May 10, 1900. Serial No. 16,202. (No model.)

*To all whom it may concern:*

Be it known that I, AUGUSTUS L. LE GRAND, a citizen of the United States, residing at West Pittston, in the county of Luzerne and State of Pennsylvania, have invented a new and useful Loading Mechanism for Conveyers, of which the following is a specification.

The present invention relates to load mechanism for bucket conveyers. Usually in those industries requiring the use of endless bucket conveyers for the conveyance of coal, ore, or other materials the loading is effected by a continuous supply of the material to the conveyer-buckets as they are successively presented below the loading-hopper by the movement of the conveyer, which transports the loaded buckets to the point of delivery, where the buckets are successively dumped as they are presented to suitable dumping mechanism. In conveyers of this character there is generally more or less space between the buckets, and where the supply of material is continuous it is necessarily scattered by passing between the buckets as they are successively brought into position under the loading-hopper. Various devices have been introduced for the purpose of preventing this waste, notable examples being the provision of covering-plates carried upon an endless chain or other carrier, the movement of which is imparted from the bucket conveyer and effects the presentation of the covering-plates above the spaces between the buckets as the latter are advanced to the hopper or chute. This expedient is objectionable, however, because it is necessary to provide mechanism for effecting the tilting of the covering-plates for the removal of such of the material as may have been deposited thereon, and, further, because it is necessary to provide the carrier with devices which engage the endless conveyer for the purpose of transmitting the necessary motion to the covering-plates. Another example of the efforts made in this direction is the provision of supplemental hoppers carried by an endless carrier, which is operated by the conveyer to present the supplemental hoppers above the buckets as they are presented under the discharge or loading chute. This structure is expensive, and, like the device comprehending covering-plates, it embraces mechanism which engages the conveyer-chains to effect the movement of the carrier and the presentation of the supplemental hoppers above the buckets. A still further and perhaps somewhat more prominent defect in the practical application of these various expedients is that they permit considerable vibration of the buckets as the coal is discharged into them with more or less violence from the loading-chute. This vibration is due to the fact that the bucket conveyer is moved continuously, and as the discharge or loading chute is arranged at an acute angle with respect to the line of travel of the conveyer the coal or other material projected into the bucket strikes first upon one side wall of the latter, causing the bucket to tilt with such suddenness and force as to endanger the integrity of covering-plates or supplemental hoppers, such as those to which reference has been made—that is to say, the covering-plates, supplemental hoppers, and other expedients employed for the protection of the intervening spaces have been more or less elevated with respect to the contiguous upper edges of the buckets and have been subjected to violent jars incident to the tilting of the buckets as they are brought under the loading-chute.

The primary object of my invention is to provide bucket-conveyer loading mechanism comprehending covering or guard plates mounted upon a suitable endless carrier and constructed and arranged to cover or guard the spaces intermediate of the buckets by actually engaging the upper edges of the contiguous side walls of adjacent buckets for the purpose of rigidly retaining the bucket against vibration and to constitute such direct connection between the guards and buckets as will effect the transmission of motion from the endless conveyer to the guard-carrier without necessity for the interposition of special forms of engaging mechanism or gearing, such as has been employed heretofore for the operative connection of covering-plate carriers and the endless conveyers cooperating therewith.

The invention consists in its more specific aspect in forming the guard-plates with cross-sectional contours of substantially V shape— first, in order to produce opposed engaging flanges between which the edges of contiguous buckets are gripped, and, second, to eliminate any flat surface which would otherwise facilitate the accumulation of the fine particles of the material upon the guard or cover plates as they are passed under the discharge end of the chute.

In a still further development the present invention comprehends the employment of a loading-hopper having an inclined loading-chute the opening to which is controlled by a gage-plate and the lower extremity of which is provided with a clearing or leveling scraper which levels off the load carried by each bucket and which is arranged to contact with each of the guard-plates to remove any accumulation thereon as the guard-plates are advanced beyond the chute by the movement of the conveyer.

The invention further consists in certain details of construction and arrangement, as will hereinafter more fully appear and as will be illustrated in the accompanying drawings and embraced within the scope of the appended claims.

In said drawings, Figure 1 is a general sectional view through so much of the apparatus as is necessary to illustrate the construction and arrangement of coöperating elements located at the loading-station. Fig. 2 is a transverse sectional view of the subject-matter of Fig. 1, and Fig. 3 is a detail plan view of one of the guard-plates and its mounting.

Referring to the numerals of reference employed to designate like parts throughout the several views, 1 indicates a short section of an endless conveyer comprehending a series of flexibly-related pivotally-mounted conveyer-buckets 2, suspended between the conveyer-chains 3, provided with travelers 4, which throughout certain portions of their travel are supported upon conveyer-tracks 5. In its general construction the conveyer 1 is ordinary, the opposed walls 6 and 7 of contiguous buckets being more or less inclined in opposite directions and said buckets being suspended freely in order that they will maintain by gravity their proper upright positions notwithstanding changes in the direction of movement of the conveyer. This necessary freedom of movement of the buckets requires them to be somewhat spaced or separated, and, as has been premised, the present invention is primarily designed to prevent the escape of material between the buckets as the conveyer is advanced continuously under the discharge-chute 8 of the loading-hopper 9. In carrying out my invention the horizontal portion of the conveyer adjacent to the loading-station is supported upon the tracks 5, and above said tracks 5 and separated by a somewhat greater distance are arranged upper and lower carrier-tracks 10 and 11, supported in any suitable manner, but preferably by standards or pillars 12. The carrier-tracks are designed for the support of the side chains 14 and 15 of what may be termed the "endless guard-carrier," said chains being passed around sprockets 16, mounted above the conveyer. The chains are provided with travelers or traveler-wheels 17, which move upon the tracks 10 and 11, it being understood that the carrier-tracks at opposite sides of the conveyers are oppositely disposed, inasmuch as the upper strand of the guard-carrier travels upon the track 10, while the lower strand of said carrier moves along the under face of the track 11. The guard-carrier is so called because it serves as a movable mounting for a series of horizontal guard-plates 18, riveted or otherwise rigidly secured to guard-supporting brackets 19, bent to form bolt-flanges 20, preferably corresponding in form to the link plates of the chains 14 and 15 and drop-flanges 21 of substantially right-angular formation and serving to support the comparatively-short guard-plates 18 out of the horizontal plane of the horizontal portions of the carrier-chains for the purpose of presenting the guard-plates sufficiently below the lower strand of said chains to cause said plates to span the spaces intervening between the buckets and to positively engage the upper edges of the contiguous walls of adjacent buckets. In order to facilitate this actually-rigid engagement which effects a connection between the conveyer and the carrier and serves to prevent tilting of the buckets, I impart to each guard-plate a transverse contour of approximate V shape—that is to say, I bend the guard-plates along a medial longitudinal line to form angularly-related engaging flanges 22 and 23, connected by a curved medial portion or breast 24.

It being understood that the guard-carrier is comparatively small and is merely a local appliance constituting a part of the loading mechanism, it will be obvious that it may be driven by the transmission of power from the conveyer. Therefore as the conveyer is advanced along that section of the track 5 adjacent to the loading-station the guard-plates will slightly overlap and directly engage the contiguous edges of adjacent buckets, which engagement is maintained to effectually close the intervening space, to prevent tilting of the buckets, and to effect a direct power-transmitting connection by reason of the fact that the plate is supported upon the carrier, which during the advance of the conveyer is in contact with the under side of the carrier-tracks 11, which tracks prevent yielding of the guard-plates in a direction at right angles to the line of travel of the conveyer, and as the conveyer is likewise supported rigidly upon the track 5 and as the guard-plates are in engagement with the opposite ends of each bucket it will be obvious that the carrier, guard-plates, brackets, and conveyer will be rigidly associated and will be incapable of all relative movement except in the direction of conveyance.

The feed of material to the conveyer from the hopper 9 is regulated by the adjustable gage-plate 25, carried by the inclined front wall 26 of the loading-hopper 9 and designed to be retained in its adjusted positions by an adjusting-screw 27, carried by the plate 25 and passed through a slot 28 in the wall 26, a compression-nut 29 being screwed upon the bolt for fixing it in its adjusted positions. The lower end of the front wall of the chute is inclined slightly with respect to the wall and is extended below the chute to form a leveling or clearing scraper 30, terminating slightly below the horizontal plane of the breasts 24 of the guard-plates 18, so that as said guard-plates are advanced under the scraper any slight accumulation of fine particles will be removed and the loaded material in each bucket as it passes the discharge-chute will be leveled off to prevent its being wasted when the guard-plate is withdrawn from engagement with the buckets by the upward movement of the guard-carrier as it passes around the forward carrier-spocket 16. Obviously the leveling-scraper 30 must be somewhat resilient; but the degree of such resiliency is a question to be considered in connection with the particular class of material to be handled.

I have stated that the carrier-chains 14 and 15 are provided with travelers 17, and in Fig. 3 I have illustrated a preferred form of the specific construction for effecting the mounting of the travelers in the chains. In this construction certain of the transverse link-connectors 31 are extended to constitute retaining devices for securing the bolt-flanges 20 to certain of the link plates and the travelers 17 are preferably mounted upon the transverse connectors or bars thus employed in order that the yielding of the guard-plates will be prevented by the location of the travelers directly behind said plates and in contact with the opposed carrier-tracks.

From the foregoing it will be observed that I have produced a novel loading mechanism for gravity bucket conveyers comprehending an endless guard-carrier supporting a series of guard-plates which do not reduce the capacity of the conveyer-buckets by extending therein to an appreciable extent, which actually engage the contiguous walls of the adjacent buckets to rigidly retain said buckets in fixed relation while passing under the loading-chute, to close the opening between the buckets and to effect a direct power-transmitting connection between the buckets and the guard-carrier, and which further comprehends means for leveling the load in each bucket as it passes from under the chute in order to eliminate the waste which might otherwise be incidental to the withdrawal of the guard-plates from engagement with the loaded buckets; but while the present embodiment of my invention appears at this time to be practicable and of minimum simplicity, and therefore preferable, I do not wish to limit myself to the identical construction and arrangement illustrated, as, on the contrary, I reserve to myself the right to effect such changes, modifications, and variations as may fall properly within the scope of the protection prayed.

What I claim is—

1. The combination with a conveyer comprising a series of independently-movable buckets, of a guard-carrier, and guard-plates carried by said guard-carrier and bent into angular form to cause the angularly-related edges of said plates to take over the edges of contiguous buckets.

2. The combination with a conveyer comprehending a plurality of spaced buckets, of a guard-carrier, guard-plates supported by the carrier and bent to engage contiguous edges of adjacent buckets for the purpose of guarding the intervening space and to effect a direct coöperative connection between the conveyer and carrier.

3. The combination with a conveyer comprehending spaced and pivotally-supported buckets, of a movable guard-carrier, guard-plates carried by the guard-carrier intermediate of the buckets and engaging contiguous buckets to guard the intervening space to retain the buckets against tilting said guard-plates constituting the sole connecting means between the conveyer and carrier.

4. The combination with a conveyer comprehending a series of pivoted buckets, of a movable guard-carrier, a series of guard-plates supported by the guard-carrier intermediate of the buckets and having a direct engagement with the contiguous edges of said buckets, and means for preventing the yielding of said plates in the direction of their withdrawal from engagement with the buckets.

5. The combination with a conveyer comprehending a series of pivoted buckets, of a guard-carrier, brackets extending laterally from said guard-carrier, guard-plates carried by said brackets and bent into engagement with contiguous buckets, and means for preventing the relative lateral movement of the carrier and conveyer for the purpose of maintaining the effective engagement of the guard-plates with the buckets during the loading of the latter.

6. The combination with a conveyer comprehending a series of pivoted buckets, of a flexible guard-carrier, guard-plates supported by the carrier in direct engagement with contiguous edges of the buckets, carrier-tracks located at the side of the carrier opposite the guard-plates, and travelers mounted in the carrier directly behind the guard-plates and engaging the carrier-tracks, whereby the guard-plates are retained in rigid engagement with the buckets to prevent tilting of the latter during the operation of loading.

7. The combination with a conveyer comprising a series of spaced and pivotally-mounted buckets, of an endless conveyer comprising side chains and intermediate guard-plates, brackets supporting the guard-plates, link-connectors retaining the brackets, travelers journaled upon said link-connectors, carrier-tracks for the reception of said travelers, and tracks for preventing lateral yielding of the conveyer.

8. The combination with a conveyer comprising a series of spaced buckets, a guard-carrier, and guard-plates supported by the carrier and engaging contiguous edges of the buckets, said guard-plates being formed with angularly-related engaging edges and a curved intermediate breast, a loading-chute mounted above the conveyer, and a leveling-scraper extending below the loading-chute slightly below the horizontal plane of the breasts of the guard-plates to cause said scraper to clear the guard-plates of accumulation and to level the loads in the buckets for the purpose of preventing waste when the guard-plates are moved from engagement with said buckets by the travel of the conveyer.

9. The combination with a conveyer comprising a series of buckets and intermediate guard-plates, of a discharge-chute, and a yielding leveling-scraper extended below the end of the chute to clear the plates and level the load deposited in the conveyer-bucket from the chute.

In testimony that I claim the foregoing as my own I have hereto affixed my signature in the presence of two witnesses.

AUGUSTUS L. LE GRAND.

Witnesses:
SAMUEL C. WEBB,
HENRY GAUPP.